US 6,615,568 B1

(12) United States Patent
Roskies (10) Patent No.: US 6,615,568 B1
(45) Date of Patent: Sep. 9, 2003

(54) METHOD FOR CUSTOMIZING A SADDLE TO A HORSE AND APPARATUSES THEREOF

(76) Inventor: Greg Roskies, 360 Chemin Planche, St-Anicet (CA), J0S 1M0

( * ) Notice: Subject to any disclaimer, the term of this patent is extended or adjusted under 35 U.S.C. 154(b) by 0 days.

(21) Appl. No.: 10/088,259

(22) PCT Filed: Sep. 13, 2000

(86) PCT No.: PCT/CA00/01060

§ 371 (c)(1),
(2), (4) Date: Mar. 13, 2002

(87) PCT Pub. No.: WO01/19722

PCT Pub. Date: Mar. 22, 2001

(30) Foreign Application Priority Data

Sep. 13, 1999 (CA) .............................. 2282151

(51) Int. Cl.[7] .............................................. B68C 1/12
(52) U.S. Cl. ........................................................ 54/66
(58) Field of Search ............................................ 54/66

(56) References Cited

U.S. PATENT DOCUMENTS

| 4,136,506 A |   | 1/1979  | Miller ............................ 54/66 |
|-------------|---|---------|-------------------------------------------|
| 4,669,255 A |   | 6/1987  | Wicks ............................ 54/66 |
| 4,683,709 A | * | 8/1987  | Vasko et al. ................... 54/66 |
| 4,827,701 A | * | 5/1989  | Gonzales ........................ 54/66 |
| 5,027,589 A |   | 7/1991  | Gleb et al. ..................... 54/66 |
| 5,058,367 A |   | 10/1991 | Evertson ........................ 54/66 |
| 5,119,618 A |   | 6/1992  | Streck ........................... 54/66 |
| 5,175,986 A |   | 1/1993  | Farley .......................... 54/44.1 |
| 5,375,397 A |   | 12/1994 | Ferrand et al. ................. 54/66 |
| 5,577,372 A |   | 11/1996 | Gronberg ........................ 54/66 |
| 5,782,070 A |   | 7/1998  | Knight et al. ................... 54/66 |
| 5,787,692 A |   | 8/1998  | Purdy ........................... 54/66 |
| 5,802,823 A | * | 9/1998  | Woods ........................... 54/66 |
| 6,050,067 A |   | 4/2000  | Knight et al. ................. 54/44.6 |

FOREIGN PATENT DOCUMENTS

| DE | 19805802 | 8/1999 |
| WO | 9717281  | 5/1997 |
| WO | 9829331  | 7/1998 |

* cited by examiner

Primary Examiner—Charles T. Jordan
Assistant Examiner—Bret Hayes
(74) Attorney, Agent, or Firm—Ware, Fressola, Van der Sluys & Adolphson LLP (57) ABSTRACT

A method for customizing the fit of a saddle to a given horse and apparatuses thereof. The method comprises a step of inserting under a saddle disposed on the horse's back, a cushion pad previously shaped to uniformly distribute the pressure of the saddle on the horse. The method may further comprise a step of shaping the cushion pad by disposing on the horse's back an impression pad which contains a putty-like material to imprint the relief pattern of the pressure distribution of a saddle disposed on the horse's back. This is followed by setting the saddle on the impression pad, by riding the horse to imprint a relief pattern of the pressure distribution of the saddle on the impression pad, and by shaping the cushion pad by reproducing the relief pattern of the impression pad.

26 Claims, 6 Drawing Sheets

METHOD FOR CUSTOMIZING A SADDLE TO A HORSE AND APPARATUSES THEREOF

CROSS-REFERENCE TO RELATED APPLICATIONS

This application is a U.S. national phase filing under 35 U.S.C. 0371 of PCT/CA00/01060 filed Sep. 13, 2000, which PCT application claims foreign priority from Canadian Patent Application No. 2,282,151 filed Sep. 13, 1999.

FIELD OF THE INVENTION

The present invention relates generally to the field of horseback riding. More specifically, it relates to a method for customizing or adjusting a saddle on a horse and the apparatuses thereof.

BACKGROUND OF THE INVENTION

Saddle fit, the relationship between horse and saddle, has perplexed equestrians since the introduction of the rigid frame saddle, in the 4th century B.C. Horsemen have long understood the importance of a well fitting saddle but did not have the tools to make an accurate determination of the saddle fit. Just as humans are not able to achieve their athletic potential in shoes that hurt, horses cannot achieve theirs with a saddle that applies uneven pressure or that impinges. Improperly fitting saddles are the single-most cause of spasms that lift and pull the horse's shoulder back, which of course inhibits proper movement. A saddle that impinges can cause restricted blood flow and spasms in these and other muscle groups. The horse's stride can become shortened which changes the way its feet make contact with the ground. This can cause damage to the suspensory ligament and superficial digital flexor tendon.

A practitioner who has involved herself with in-depth studies of saddles and proper fit is Joyce C. Harman, DVM, MRCVS, of Harmany Equine Clinic, in Washington, Va. Harman has presented papers and discussions on the subject, including a presentation at the 1997 meeting of the Association of Equine Sports Medicine in San Antonio, Tex. She has also written extensively on the subject, including authorship of a book on saddles and proper fit. "Saddles are the necessary evils of the competition horse," says Harman. "A saddle is a rigid structure that connects the dynamic structures of the horse with the rider. The fit and position of the saddle affect the movement of the horse and the ability of the rider to communicate his or her wishes to the horse. Saddles contribute in a major way to the poor-performance syndrome and to the behavior and lameness problems seen in horses in every sport."

Fitting this basically rigid structure correctly to a horse's back can be confusing and frustrating, Harman says, because so many variables are involved. There also is the matter of cost. "Few horse owners can afford to have a specially designed saddle for each horse in the stable. Or, if they own only one horse, it often is not economically feasible for them to obtain a new saddle if the current horse is sold or traded and another one obtained.

Many riders attempt to correct a saddle fit problem with a pad. That rarely works", says Harman: "Numerous saddle pads are on the market to try to solve the fitting problem; however, the majority of them create more problems than they solve. Putting a pad across the withers under a saddle that is already too narrow can be compared to putting on thick socks inside a pair of shoes that are already too small. The pressure actually increases and muscle atrophy is often the result."

There have been prior approaches to solving the problem of saddle fit. Talley Inc. of Romsey, England, developed a pad formed of air cells that are connected to a controller unit via thin flexible plastic tubes. Vistamed of Winnipeg, Canada, developed an array using force-sensitive resistors. Tekscan, a company in Cambridge, Mass., developed an extensive array using a force-sensitive ink printed on a polyester film. U.S. Pat. No. 5,315,397 discloses a sensor array pad for determining the pressure distribution under a saddle. The pressure sensed by the sensors are input to the computer which generates a display of the pressure distribution. Also known, there is a mechanical device, which allows a user to measure a horse's back and compare the findings on a saddle.

All the prior approaches had various limitations, including but not limited to; the systems being too cumbersome, too expensive and in most cases too technically demanding for the average equestrian. There is another major shortcoming with the aforementioned systems. They are all designed to test saddle fit on a static horse; a horse which is stationary. This is inherently wrong since it is believed that the relationship between a saddle and a horse can only be well understood when there is a person on the saddle and the horse is actually moving.

Other examples of prior art related to this field are given in U.S. Pat. Nos. 4,136,506; 4,669,255; 5,027,589; 5,058,367; 5,119,618; 5,175,986; 5,375,397; 5,577,372; 5,782,070; 5,787,692; 6,050,067; and WO 97/17281.

There is thus presently a need for a method and/or apparatuses to improve the saddle fit of a horse.

SUMMARY OF THE INVENTION

It is therefore an object of the present invention to provide a method and apparatuses that satisfy that need.

More particularly, the present invention provides an impression pad for revealing a relief pattern of the pressure distribution of a saddle on the back of a horse, the saddle having an underside including two symmetrical bars of a definite surface area adapted to be positioned on the horse's back. The impression pad comprises:

- an envelope made of a flexible material and having a surface area at least as large as the surface area of the bars of a saddle; and
- a moldable putty material contained in the envelope.

The invention also provides a method for obtaining a relief pattern of the pressure distribution of a saddle on the back of a horse, comprising the steps of:

a) providing and levelling an impression pad as defined above;

b) positioning between the saddle and the horse's back the flattened impression pad of step a); and c) riding the horse for a time sufficient to imprint on the impression pad the relief pattern of the pressure distribution of the saddle on the back of the horse.

The present invention further provides a method for customising the fit of a saddle to a horse, comprising the steps of:

a) providing and levelling an impression pad as defined above, b) positioning between the saddle and the horse's back the flattened impression pad of step a);

c) riding the horse for a time sufficient to imprint on the impression pad the relief pattern of the pressure distribution of the saddle on the back of the horse;

d) shaping a corrective cushion pad having a relief pattern conforming to the relief pattern obtained in step c), and e) positioning between the saddle and the back of the horse the corrective cushion pad obtained in step d).

The corrective cushion pad preferably consists of two individual and symmetrical cushion pads which are respectively positioned in step e) under a corresponding bar of the saddle. Also preferably, step d) of shaping a corrective cushion pad comprises, for each individual cushion pad, the steps of:

providing a base panel and a set of cushion spacers of varying thickness, each cushion spacer having a face removably securable to a face of the base panel; and securing cushions spacers to the base panel in such a fashion as to replicate the relief pattern of the impression pad obtained in step c).

Also preferably, step d) comprises the step of:

attaching the base panel of each individual cushion pad to a corresponding side of the impression pad of step c) prior to securing the cushion spacers thereto.

In a still preferred version of the method, step e) of positioning the impression pad between the saddle and the back of the horse comprises the steps of:

providing a saddle blanket having a built-in pocket for receiving the individual cushion pads;

inserting the individual cushion pads into the pocket of the saddle blanket; and positioning the saddle blanket between the saddle and the horse's back.

Also preferably, the method may comprise, between steps d) and e), the step of:

verifying the accuracy of the corrective cushion pad shaped in step d), which could be done by;
  i) levelling the impression pad and positioning it on the horse's back;
  ii) positioning the corrective cushion pad obtained in step d) between the impression pad and the saddle;
  iii) riding the horse for approximately the same time as in step c) to imprint a relief pattern of the pressure distribution of the saddle on the back of the horse;
  iv) checking the relief pattern of the impression pad revealed in step iii) and, if it is not flat, rectifying the relief pattern of the corrective cushion pad to conform to the relief pattern of the impression pad; and
  v) repeating steps ii) to iv) until the impression pad obtained in step iii) is even.

The present invention is also directed to a kit for shaping a corrective cushion pad as described above, the kit comprising:

a pair of symmetrical base panels each having a first face opposite a second face and a contour substantially conforming to a contour of the bars of a saddle; and a set of cushion spacers of varying thickness and of varying length, each having a face removably securable to the first face of each base panel.

The invention is further directed to a kit for customizing the fit of a saddle to the back of a horse, the kit comprising:

an impression pad as defined above; and a kit for shaping a corrective cushion pad as defined above.

What makes the present method and apparatuses so exemplary, is that once an impression is obtained with the impression pad, a user is able to customize the corrective cushion pad to compensate for any uneven distribution of saddle pressure. Whenever required, the saddle can be retested and further adjustments can be made to the corrective cushion pad.

BRIEF DESCRIPTION OF THE DRAWINGS

The present invention and its advantages will be more easily understood after reading the following nonrestrictive description of a preferred embodiment thereof, made with reference to the following drawings wherein.

DESCRIPTION OF A PREFERRED EMBODIMENT

Impression Pad

Figure 1:
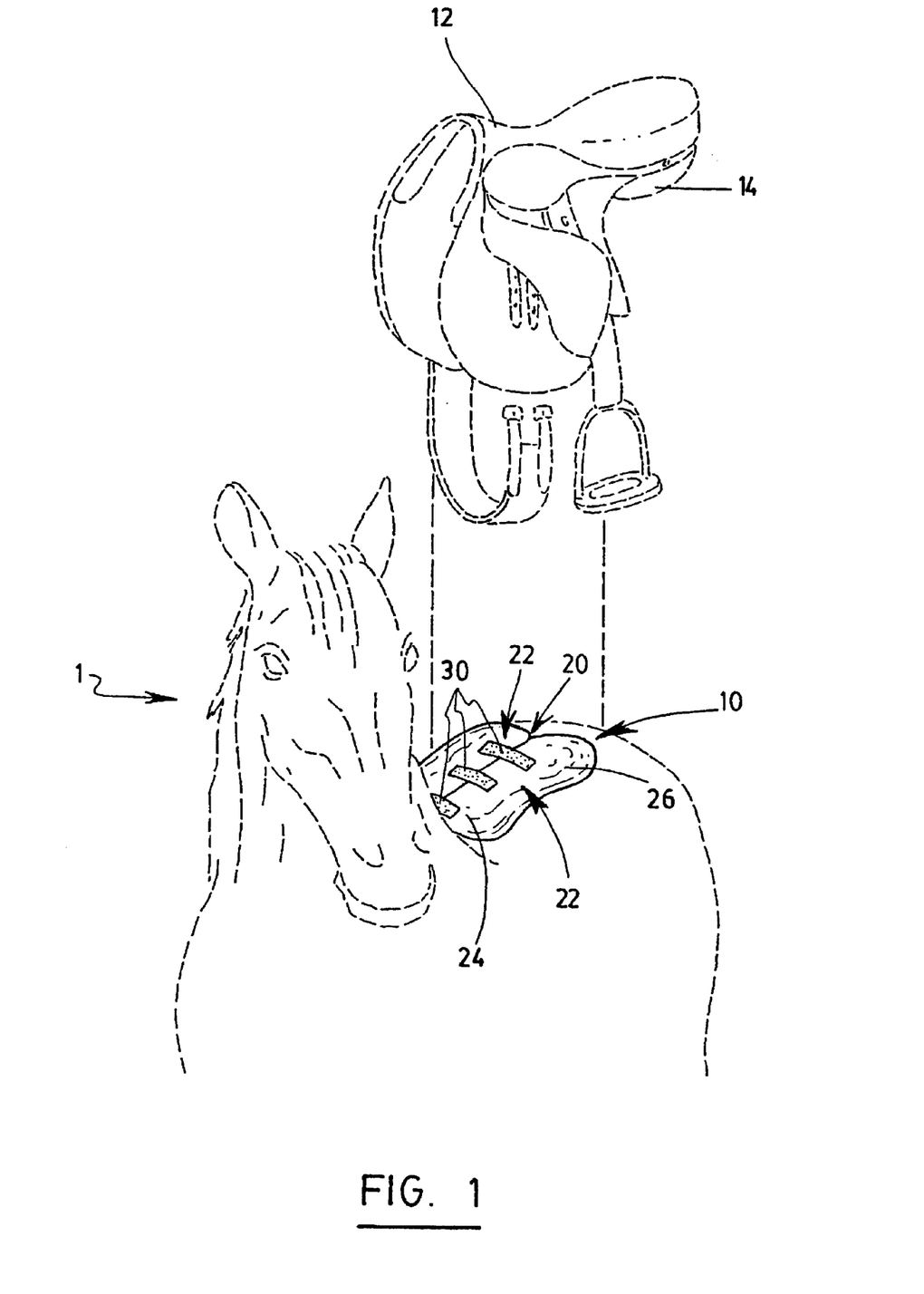
FIG. 1 is a perspective view of an impression pad according to a preferred embodiment of the invention disposed on a horse's back, and ready to receive the saddle.

With reference to FIGS. 1 to 4, an impression pad (10) according to a preferred embodiment of the invention is illustrated. The impression pad (10) is used for revealing the relief pattern of the pressure distribution of a saddle (12) on the back of a horse (1). It comprises an envelope (16) made of a flexible material filled with a moldable putty-like material (18), preferably a non hardening material. As well known in the art and as shown in FIG. 1, a saddle (12) typically comprises an underside including two symmetrical bars (also called panels) (14) adapted to be positioned on the horse's back to support the weight of a rider on the horse (1). Only one of these symmetrical bars (14) can be viewed in FIG. 1. Among all the components of a saddle (12), it is these bars (14) which exert all of the pressure on the horse's back. Therefore, and as can be appreciated from FIG. 1, 2B or 3B, the envelope (16) has a surface area at least as large as the surface area of the bars (14) of the saddle (12), whereby the pressure exerted by the side bars (14) is transmitted to the impression pad (10) when it is positioned between the saddle (12) and the horse's back. More preferably, it is larger so to make sure that all the pressure exerted is transmitted to the impression pad (10). The impression pad (10) preferably has a design similar to existing saddle pads, such as the ones used in English Riding or Western riding.

The envelope (16) is preferably made of plastic, more preferably it is constructed from clear flexible vinyl. The gauge of the vinyl is preferably approximately #20. However, it has to be noted that the envelope could be made of any other flexible material such as textile, as long as it allows the putty material contained therein to be easily deformed. The putty-like material (18) could be made from any dough recipe, most preferably it could be made from a flour, salt, mineral oil, water and cream of tartar recipe.

Figure 2A:
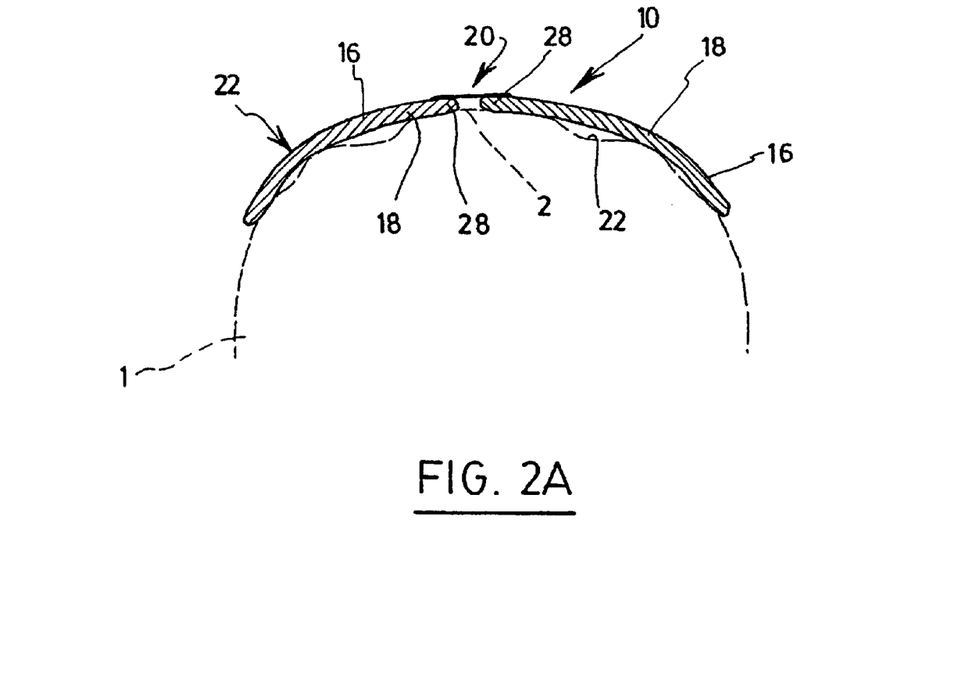
FIG. 2A is a cross-sectional front view of the impression pad of FIG. 1, before disposing a saddle thereon.
Figure 2B:
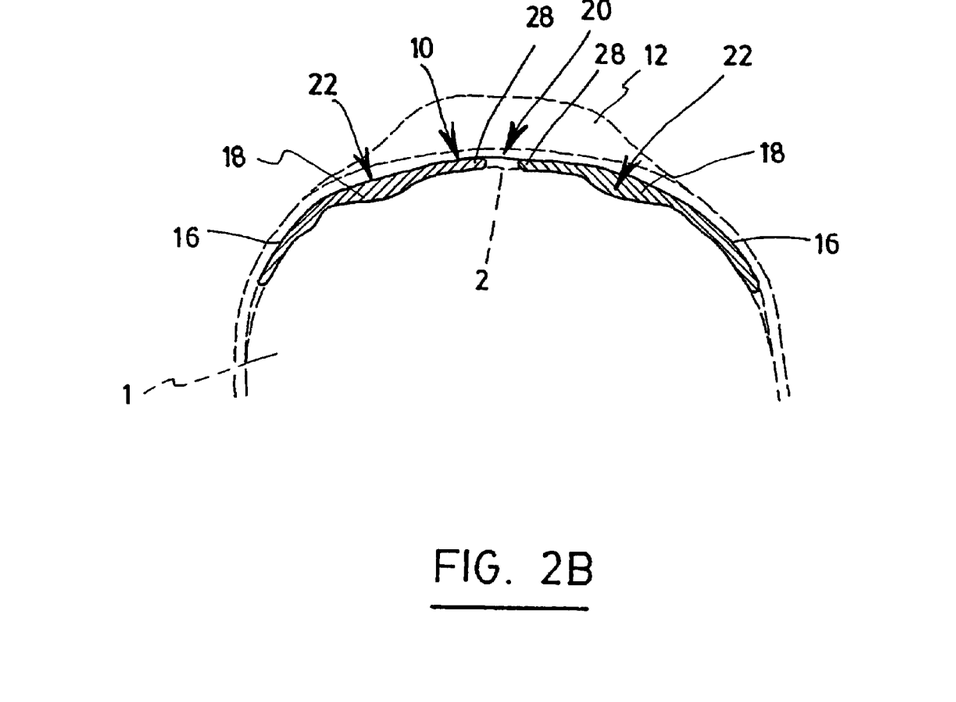
FIG. 2B is the same view as in FIG. 2A showing a saddle disposed on the impression pad, and after the horse has been mounted and ridden.

As shown in FIGS. 1, 2A and 2B, the impression pad (10) preferably comprises a centrally located channel area (20) devised to cover the spine (2) of the horse from the withers area (4) to the back area (6) of the horse. The impression pad (10) further comprises two side sections (22) each extending laterally from a side of the channel area (20). Each of the side sections (22) includes a front portion (24), devised to cover the shoulder area of the horse, and a back portion (26), devised to cover the back (6) of the horse. The front portion (24) is wider than the back portion (26) so to conform with the shape of the horse.

In the preferred embodiment shown, the two side sections (22) of the envelope (16) consist of two individual side envelopes each having an inner edge (28) removably connectable to the inner edge (28) of the other side section (22) so to form the centrally located channel area (20) of the pad (10) once connected. A hook and loop (VELCRO®) type fastening, such as hook and loop fastener (VELCRO®) straps (30) can be used to connect the inner edges (28) of the side sections (22) of the envelope (16) together. Only one of thetwo side sections (22). is illustrated in FIG. 4.

Figure 4:
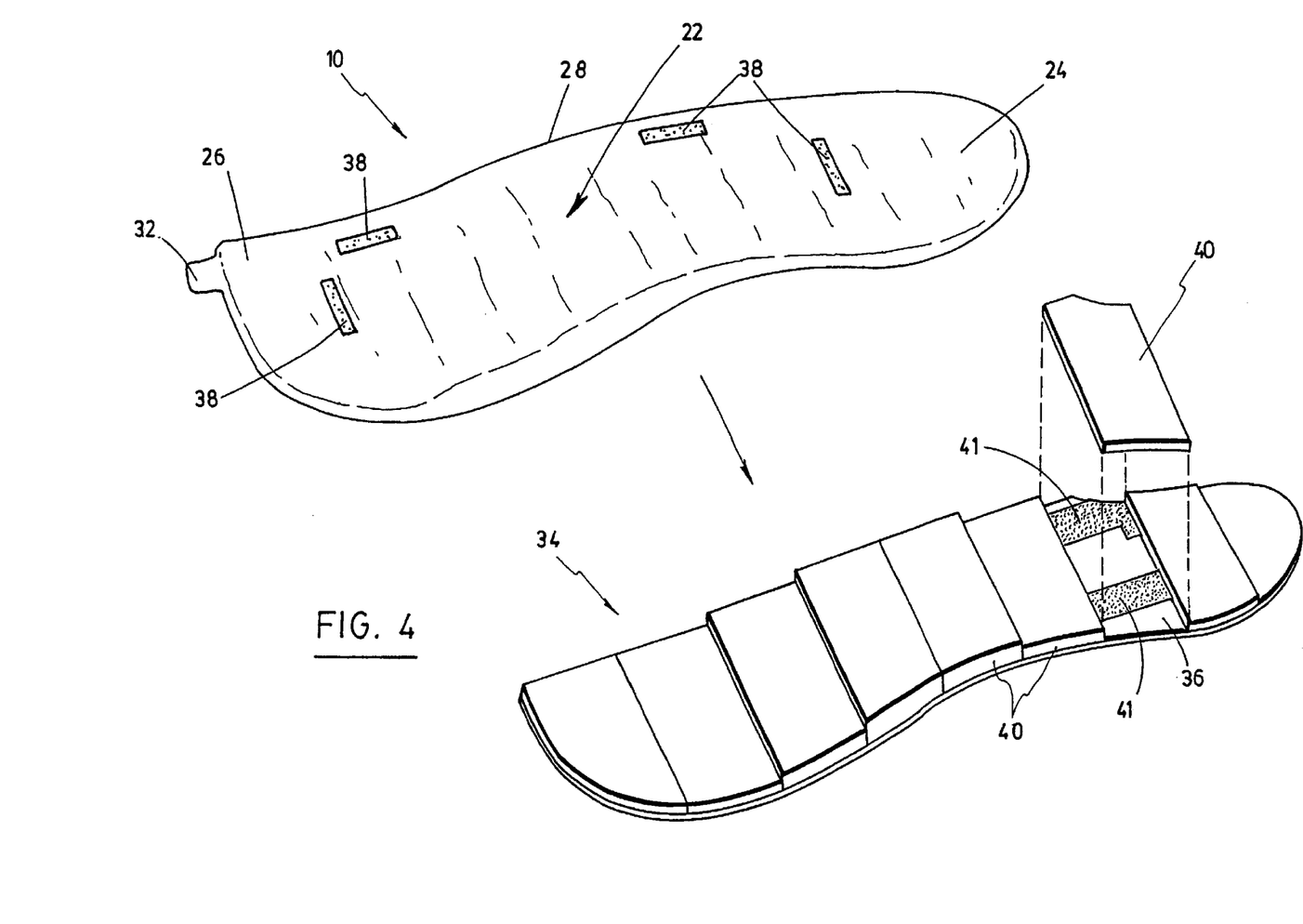
FIG. 4 is a perspective view of one side section of the impression pad of FIG. 1 with the relief pattern imprinted thereon and serving as a model to shape a corrective cushion pad according to the invention.

Referring to FIG. 4, the envelope (16) may advantageously comprise a closable outlet (32) to release the air that may be trapped in the envelope (16).

In another embodiment of the invention not illustrated, the envelope could advantageously be a one piece envelope wherein the two side sections would be permanently connected to the centrally located channel area.

Method of Obtaining the Relief Pattern of the Pressure Distribution Under a Saddle The pressure distribution of the saddle (12) on the back of a horse (1) in movement and carrying a rider can be obtained or revealed by first a) levelling an impression pad (10) as described above. This can be performed by placing the impression pad (10) on a flat surface and levelling it with the use of a (baker's) rolling pin so that the putty material (18) inside the impression pad (10) is of a consistent thickness, as in FIGS. 2A and 3A. As apparent to any person skilled in the art, the impression pad (10) could be levelled by any other way.

Then, as shown in FIGS. 2A, 2B, 3A and 3B, the levelled impression pad (10), is b) placed on the back of a horse (1), its location being the same as a normal saddle pad. The hook and loop fastener (VELCRO®) straps (30) are adjusted so that the impression pad (10) lies flat against the contours of the horse's back.

A saddle (12) is then placed on the impression pad (10). It will be understood that the present invention contemplates employing saddles of different shapes and types, preferably English and Western saddles. The saddle (16) is harnessed in the normal fashion.

Figure 3A:
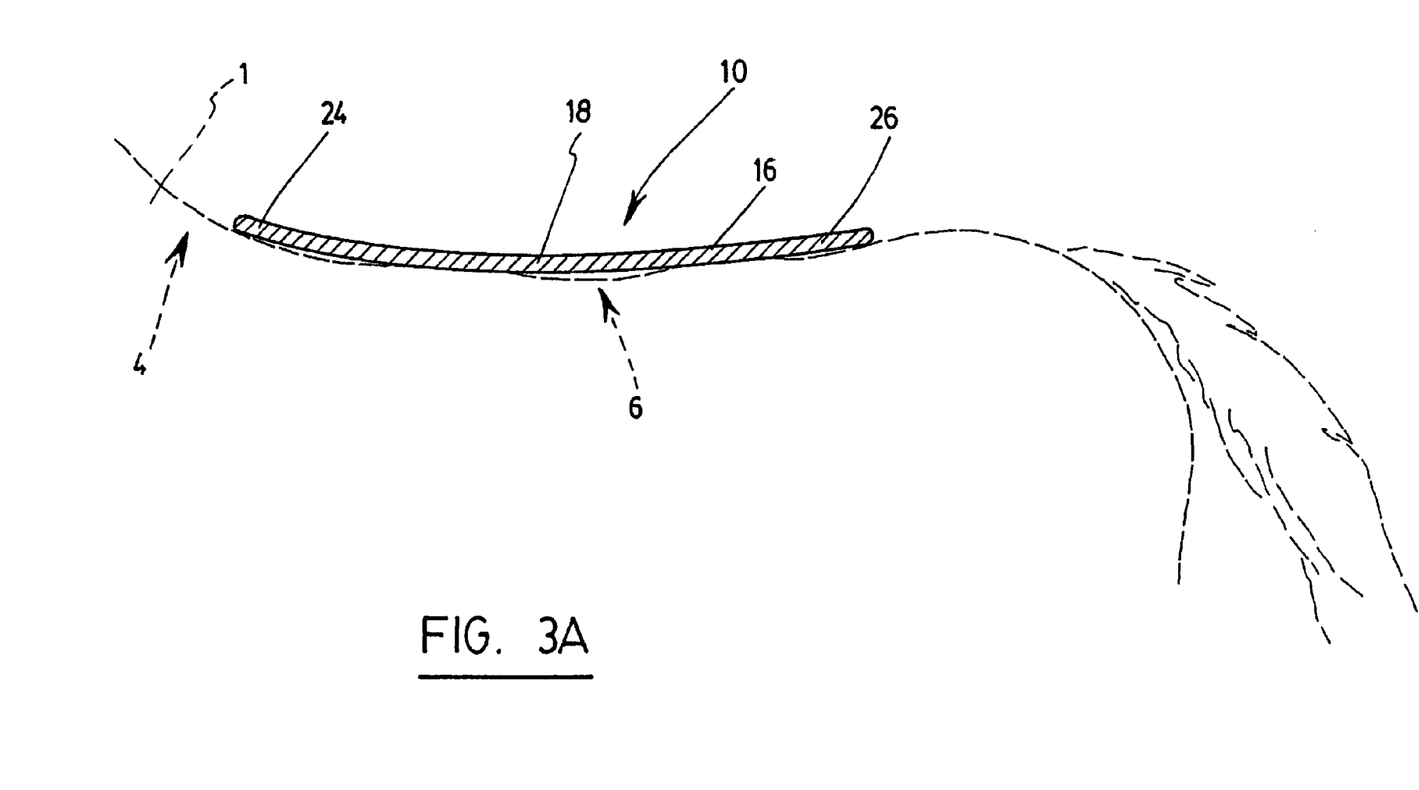
FIG. 3A is a cross-sectional side view of the impression pad without the saddle on as in FIG. 2A.
Figure 3B:
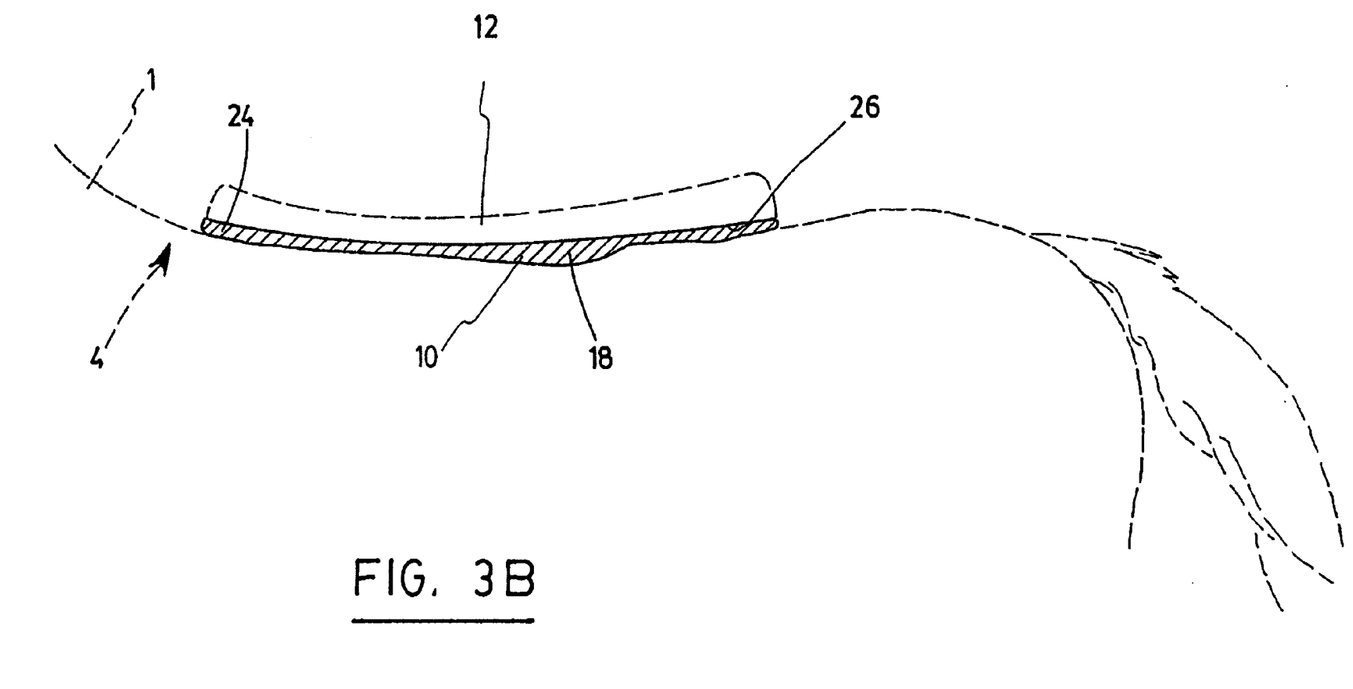
FIG. 3B is the same view as in FIG. 3A with a saddle, as in FIG. 2B.

Then, c), a rider mounts the horse (1) and puts him through a series of manoeuvres for a time sufficient to imprint, on the impression pad (10), the relief pattern of the pressure distribution under the saddle (12), as shown in FIGS. 2B and 3B. The time required is generally approximately 30 minutes. In fact, the time sufficient to create an impression varies with the temperature of the putty material (18), the weight of the rider and how poorly the saddle fits.

The rider then dismounts and removes the saddle (12). The impression pad (10) is examined. The pressure distribution under the saddle (12) becomes evident based on how the putty material (18) in the envelope (16) has been moulded, as in FIGS. 2B, 3B and 4. The areas where the saddle (12) impinges or applies the most pressure; the putty material (18) may be displaced to the extent, that the hair on the horse's back will be visible through the impression pad (10).

Method for Customising the Fit of a Saddle to a Horse

Then, to customise the fit of the saddle (12) to the horse (1), the method further comprises the steps of d) shaping a corrective cushion pad (34) having a relief pattern conforming to the relief pattern obtained in step c) above, as shown in FIG. 4; and e) positioning between the saddle (12) and the back of the horse (1) the corrective cushion pad (34) obtained in step d). The corrective cushion pad (34) preferably consists of two individual and symmetrical cushion pads, only one of which is illustrated in FIG. 4.

The shaping of each of the individual corrective cushion pads (34) preferably consists of temporarily attaching a base panel (36), preferably made of leather, to each portion of the impression pad (10) in a predesignated area with hook and loop fastener (VELCRO®) attachments (38). This step could also be performed by placing the imprinted impression (10) and the base panel (36) of the cushion pad (34) side by side, as in FIG. 4. These panels (36) are preferably made from 7–8 oz. polyurethane coated leather, although any.other relatively resistant and somewhat flexible material could be used. Preferably, they are approximately 21 inches in length and have a contoured shaped with a maximum width of approximately 7 inches, to conform with the shape of most types of horses. The polyurethane coated leather is employed because it doesn't allow for absorption of perspiration from the horse, the leather will not change shape. Then, cushion spacers (40), preferably closed-cell foam rubber spacers, are attached to the leather panels (36) with hook and loop fastener (VELCRO®) attachments (41), for example, or any other type of removable attachment could be used. The cushion. spacers (40) may preferably have.a closed-cell construction, each cell encapsulating a bubble of air. The cushion spacers (40) will preferably not absorb moisture and will remain lofty even under extreme pressure. The cushion spacers (40) are made in the same design as the base leather panels (40) but cut into sections. Each section is approximately 2 inches in width, the length being determined by the contour of the panel design. The cushion spacers (40.) are available in varying thickness, which could include ⅛ inch, ¼ inch, ½ inch and ¾ inch. The positioning of the foam rubber spacers (40) on the leather panels (36) is determined by the relief pattern of the impression paid (10). The foam rubber spacers (40) are placed in such a fashion as to replicate the relief pattern of the impression pad (10), as shown in FIG. 4. The highest spacers are placed where there has been the least amount of saddle pressure.

The impression pad (10) is placed again and the two corrective cushion pads (34) are installed thereon.

The saddle (12) is again placed on the impression pad (10), which is now equipped with two corrective cushion pads (34). The saddle (12) is harnessed in the normal fashion.

A rider mounts the horse (1) and again puts him through a series of manoeuvres.

The saddle (12) is removed. If the impression pad (10) indicates that there has been an equalization of saddle pressure, the leather panels (36) with foam rubber spacers (40) are removed from the impression pad (10). Sometimes, minor adjustments are required to the location of the spacers (40), the rider can simply reposition the adjusted cushion pad (34) on the impression pad (10), ride the horse and check the relief pattern of the impression, and repeat these steps until the equalization of the impression pad (10).

Figure 5:
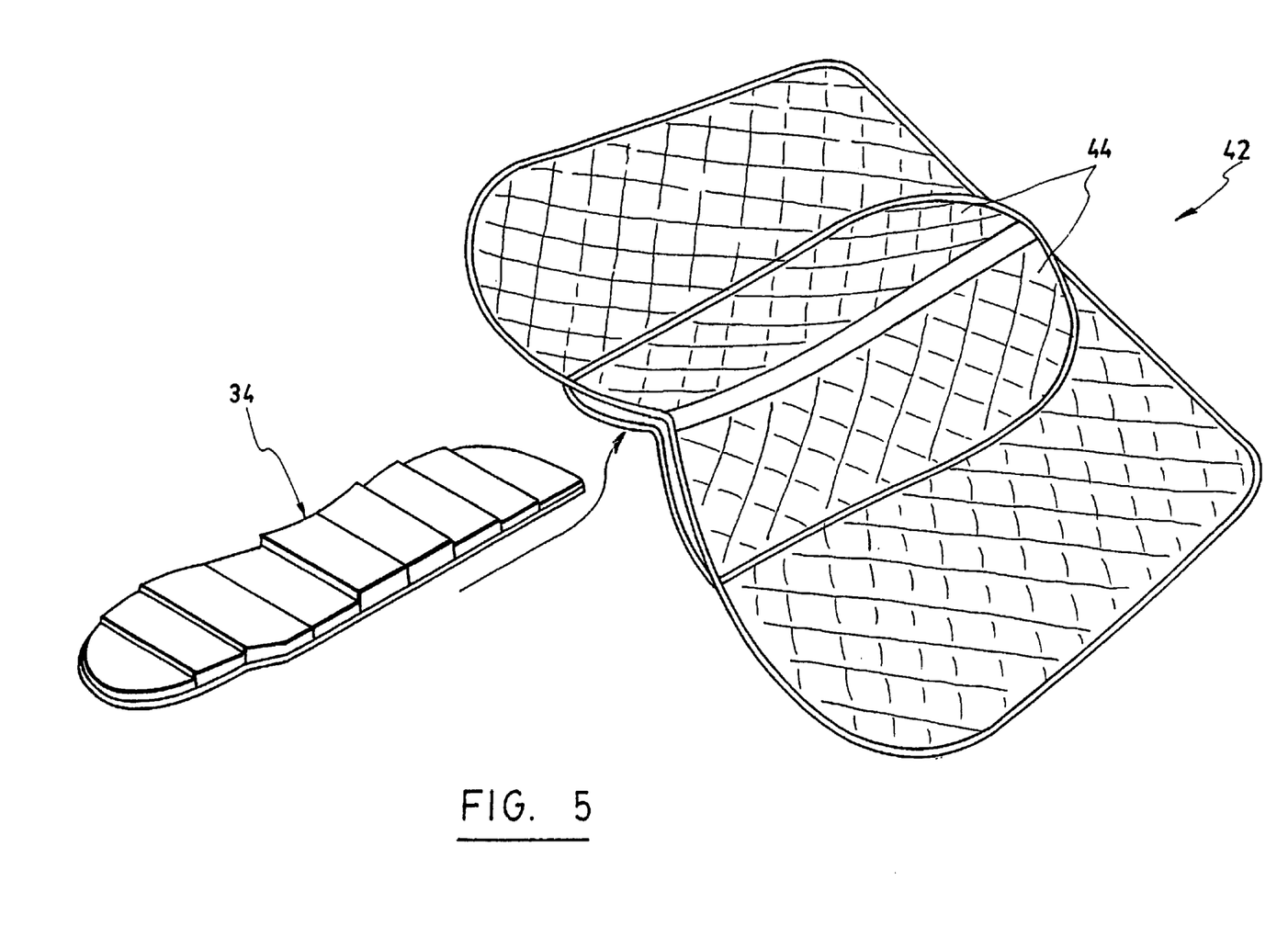
FIG. 5 is a perspective view of a saddle blanket adapted to receive the corrective cushion pad shown in FIG. 4.

Once the impression pad (10) is equalized (in other words, even), it is removed from the horse's back and replaced with a saddle blanket (42). Referring to FIG. 5, the saddle blanket (42) could be similar to existing designs but it has at least one built-in pocket (44) to receive the corrective cushion pads (34). In the preferred embodiment illustrated in FIG. 5, the saddle blanket (42) comprises one centrally located built-in pocket with an opening in the front end. However, in another embodiment, not illustrated, the saddle blanket (42) may include two lateral built-in pockets (44) or one centrally located built-in pocket with a rear opening. The fabric for the saddle blanket (42) is advantageously made from natural and man-made fibres. Fabrics such as Fleece, Sherpa, woven and flat knit could be used.

The corrective cushion pads (34) are finally inserted in the pocket (44) of the saddle blanket (42). A customized saddle pad has been created. Any time a horse changes shape or a rider changes horse, the saddle pad can be modified. In this regard, it has to be noted that a saddle that fits a certain horse at the beginning of a competitive season may not fit that horse by the end of the season. Horses in competition generally change shape three times during the competitive season. After a winter's layover, they start out heavy and wide. As training progresses, they will lose weight and gain muscle tone. This will result in a narrower body with more muscle development in the front and rear quarters. By the end of the season, the horse will be at its thinnest, with even more muscle bulk.

The present invention thus advantageously provides a simple and inexpensive method and apparatuses for customizing the fit of a saddle to a horse, even when the characteristics of the horse change.

Although a preferred embodiment of the present invention have been described in detail herein and illustrated in the accompanying drawings, it is to be understood that the invention is not limited to this precise embodiment and that various changes and modifications may be effected therein without departing from the scope or spirit of the present invention.

What is claimed is:

1. An impression pad for revealing a relief pattern of the pressure distribution of a saddle on the back of a horse, the saddle having an underside including two symmetrical bars of a definite surface area adapted to be positioned on the horse's back, the impression pad comprising:
   an envelope made of a flexible material and having a surface area at least as large as the surface area of the bars of a saddle; and
   a moldable putty material filling the envelope.

2. An impression pad as claimed in claim 1, wherein the envelope comprises:
   a centrally located channel area devised to cover the spine of a horse from the withers area to the back area of the horse; and
   two side sections each extending laterally from a side of the channel area and including a front portion devised to cover the shoulder area of a horse and a back portion devised to cover the back of a horse.

3. An impression pad as claimed in claim 2, characterized in that said front portion is wider than the back portion.

4. An impression pad as claimed in claim 3, characterized in that the two side sections of the envelope consist of two individual side envelopes each having an inner edge connectable to the inner edge of the other side section so to form the centrally located channel of the envelope once connected.

5. An impression pad as claimed in claim 4, wherein the pad comprises a hook and loop type fastening to connect the inner edges of the side envelopes together.

6. An impression pad as claimed in claim 1, wherein the envelope is made of plastic.

7. An impression pad as claimed in claim 6, wherein the plastic is vinyl.

8. A method for obtaining a relief pattern of the pressure distribution of a saddle on the back of a horse comprising the steps of:

a) providing and levelling an impression pad, the impression pad comprises:
   an envelope made of a flexible material and having a surface area at least as large as the surface area of two symmetrical bars on an underside of the saddle; and
   a moldable putty material filling the envelope;

b) positioning between the saddle and the horse's back the levelled impression pad of step a); and c) riding the horse for a time sufficient to imprint on the impression pad the relief pattern of the pressure distribution of the saddle on the back of the horse.

9. A method as claimed in claim 8, characterized in that the step a) of levelling the impression pad comprises the step of:
   rolling a roller on the impression pad.

10. A method for customising the fit of a saddle to a horse, the saddle having an underside including two symmetrical bars adapted to be positioned on the back of a horse, the method comprising the steps of:

a) providing and levelling an impression pad, the impression pad comprises:
   an envelope made of a flexible material and having a surface area at least as large as the surface area of the two symmetrical bars on the underside of the saddle; and
   a moldable putty material filling the envelope;

b) positioning between the saddle and the horse's back the flattened impression pad of step a);

c) riding the horse for a time sufficient to imprint on the impression pad the relief pattern of the pressure distribution of the saddle on the back of the horse;

d) shaping a corrective cushion pad having a relief pattern conforming to the relief pattern obtained in step c); and e) positioning between the saddle and the back of the horse the corrective cushion pad obtained in step d).

11. A method as claimed in claim 10, characterized in that the corrective cushion pad includes two individual cushion pads which are respectively positioned in step e) under a corresponding bar of the saddle.

12. A method as claimed in claim 11, characterized in that step d) of shaping a corrective cushion pad comprises, for each individual cushion pad, the steps of:
   providing a base panel and a set of cushion spacers of varying thickness, each cushion spacer having a face removably securable to a face of the base panel;
   securing cushion spacers to the base panel in such a fashion as to replicate the relief pattern of the impression pad obtained in step c).

13. A method as claimed in claims 12, characterized in that step e) comprises the steps of:
   providing a saddle blanket having at least one built-in pocket for receiving the individual cushion pads;
   inserting the individual cushion pads into the at least one pocket of the saddle blanket; and
   positioning the saddle blanket between the saddle and the horse's back.

14. A method as claimed in claim 13, characterized in that step d) further comprises the step of:
   attaching the base panel of each individual cushion pad to a corresponding side of the impression pad prior to securing the cushion pad thereto.

15. A method as claimed in claim 11, characterized in that it comprises between steps d) and e), the step of:
   verifying the accuracy of the corrective cushion pad shaped in step d).

16. A method as claimed in claim 15, characterized in that the step of verifying the accuracy of the corrective cushion pad comprises the steps of:
- i) levelling the impression pad and positioning it on the horse's back;
- ii) positioning the corrective cushion pad obtained in step d) between the impression pad and the saddle;
- iii) riding the horse for approximately the same time as in step c) to imprint a relief pattern of the pressure distribution of the saddle on the back of the horse;
- iv) checking the relief pattern of the impression pad revealed in step iii) and, if it is uneven, rectifying the relief pattern of the corrective cushion pad to conform to the relief pattern of the impression pad; and
- v) repeating steps ii) to iv) until the relief pattern of the impression pad obtained in step iii) is even.

17. A kit for shaping a corrective cushion pad based on a relief pattern from an impression pad, the corrective cushion used for distributing pressure of a saddle on the back of a horse, the saddle having two symmetrical bars underneath adapted to be positioned on the shoulder and the back of the horse, the kit comprising:
- a pair of symmetrical base panels each having a first face opposite a second face and a contour substantially conforming to a contour of the side panels of the saddle; and
- a set of elongated cushion spacers of varying thickness and of varying length, each having a face removably securable to the first face of each base panel to extend across a longitudinal axis thereof to cover the first face thereof and thereby replicate the relief pattern of the impression pad.

18. A kit as claimed in claim 17, characterized in that the base panels are made of leather.

19. A kit as claimed in claim 18, characterized in that the cushion spacers are made of closed-cell foam rubber.

20. A kit for customizing the fit of a saddle to the back of a horse, the saddle having two symmetrical bars adapted to be positioned on the shoulder and back of the horse and side panels, the kit comprising:
- (a) an impression pad comprising:
    - an envelope made of a flexible material and having a surface area at least as large as the surface area of the two symmetrical bars on an underside of the saddle;
    - a moldable putty material filling the envelope; and
- (b) a kit for shaping a corrective cushion pad used for distributing pressure of the saddle on the back of the horse, the kit for shaping a corrective cushion pad comprising:
    - a pair of symmetrical base panels each having a first face opposite a second face and a contour substantially conforming to a contour of the side panels of the saddle; and
    - a set of cushion spacers of varying thickness and of varying length, each having a face removable securable to the first face of each base panel.

21. A kit as claimed in claim 20, characterized in that it further comprises:
- a saddle blanket having at least one built-in pocket to receive the corrective cushion pad.

22. A kit as claimed in claim 21, characterized in that said at least one built-in pocket consists of two opposite side pockets.

23. A method using an impression pad, the method comprising:
- (a) providing an impression pad, the impression pad comprises:
    - an envelope made of a flexible material and having a surface area at least as large as the surface area of two symmetrical bars on an underside of a saddle; and
    - a moldable putty material filling the envelope; and
- (b) using the impression pad to reveal the pressure distribution of the saddle on a horse's back.

24. A kit for customizing the fit of a saddle to the back of a horse according to claim 20, wherein the envelope comprises:
- a centrally located channel area devised to cover the spine of the horse from the withers area to the back area of the horse; and
- two side sections each extending laterally from a side of the channel area and including a front portion devised to cover the shoulder area of the horse and a back portion devised to cover the back of the horse.

25. A kit for customizing the fit of a saddle to the back of a horse according to claim 24, wherein said front portion is wider than the back portion.

26. A kit for customizing the fit of a saddle to the back of a horse according to claim 25, wherein the two side sections of the envelope consist of two individual side envelopes each having an inner edge connectable to the inner edge of the other side section soto form the centrally located channel of the envelope once connected.

* * * * *